May 1, 1923.
M. W. MATTSON
PLANT WATERER
Filed Nov. 20, 1920
1,453,401
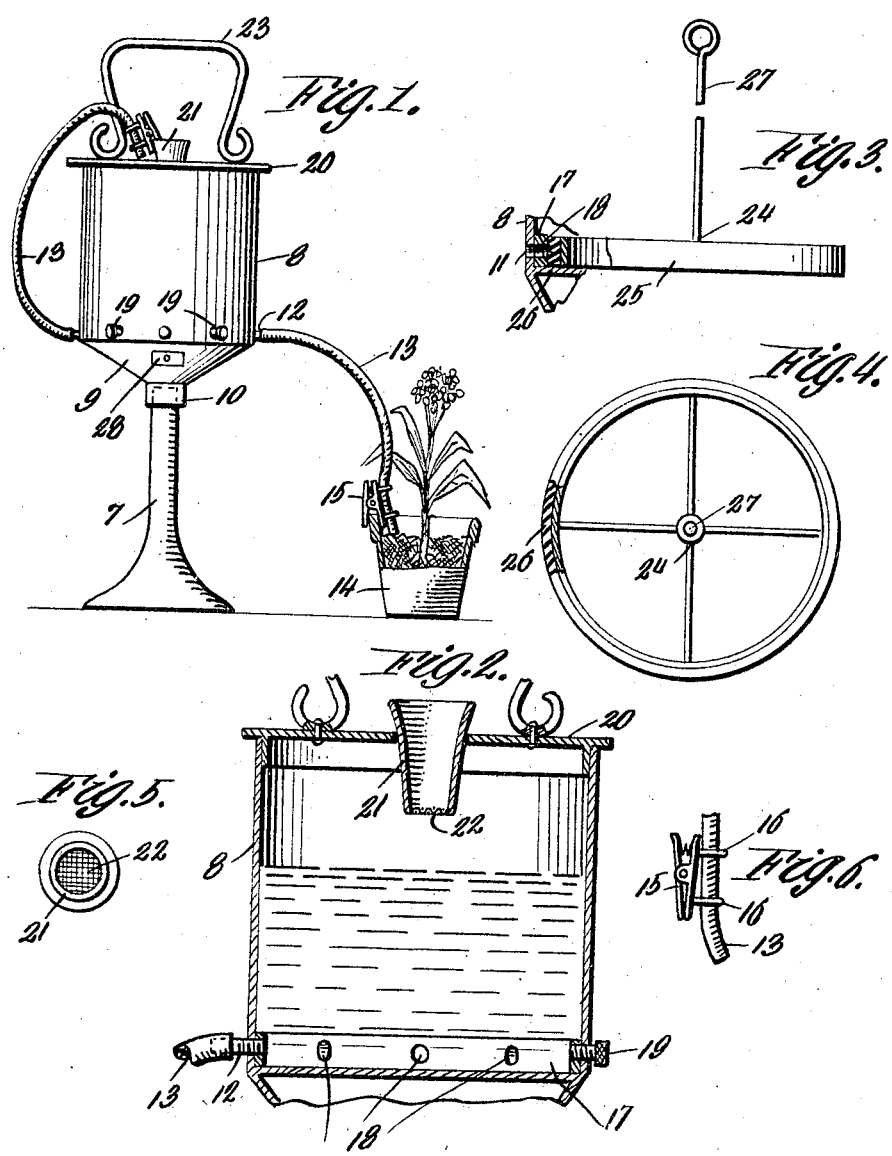
WITNESSES
MARY W. MATTSON INVENTOR.
BY
ATTORNEY.

Patented May 1, 1923.

1,453,401

UNITED STATES PATENT OFFICE.

MARY W. MATTSON, OF HANSBORO, NORTH DAKOTA.

PLANT WATERER.

Application filed November 20, 1920. Serial No. 425,438.

*To all whom it may concern:*

Be it known that I, MARY W. MATTSON, a citizen of the United States, residing at Hansboro, in the county of Towner and State of North Dakota, have invented certain new and useful Improvements in Plant Waterers, of which the following is a specification.

The present invention relates to plant waterers and has for its object the provision of a device which will simultaneously irrigate a plurality of plants without any attention from the user.

A further object is to provide a portable plant waterer which may be conveniently handled and which will dispense the water in any desired volume and in a concentrated jet to prevent splashing or displacement of the water.

The above and other objects of this invention will be in part described and in part understood from the following description of the present preferred embodiment of the invention taken in connection with the accompanying drawings, wherein:

Fig. 1, is a side elevational view of a waterer constructed in accordance with my invention illustrating its application.

Fig. 2, is a fragmentary vertical sectional view of the same.

Fig. 3, is a detail fragmentary sectional view of the device showing the valve member used in the present invention.

Fig. 4, is a top plan view of the valve member.

Fig. 5, is a top plan view of the water spout, and

Fig. 6, is a fragmentary side elevational view of one of the tubes of this invention showing a plant clasp associated therewith.

The invention embodies a vertical supporting stand 7 which may be of any desired shape, size and material, and has mounted on the top thereof a water containing receptacle generally designated 8. The receptacle is preferably of a cylindrical configuration and has the lower end thereof issuing into a cone shaped body 9, which terminates in an annulus 10, the latter embracing the top of said stand 7. The water receptacle is provided with a plurality of screw threaded outlet openings 11 formed therein at the bottom of the receptacle, which are adapted for the reception of externally screw threaded pipes 12, the outer end of the latter being engaged with flexible tubes 13. These tubes are used for carrying the water from the receptacle to a plant such as indicated at 14 in Fig. 1, and are held thereon by a clasp 15. The clasp preferably consists of a conventional form of spring finger clasp which engages over the flower pot, which contains the plant, and has loops 16 formed on one side thereof through which the tube 13 extends. In this position the outlet end of the tube will be held directly within the flower pot to prevent splashing of the water. If desired, a ring 17 may be mounted in the receptacle 8 and engaged with the bottom thereof as shown to advantage in Fig. 2. This ring is provided with a series of openings 18 formed therein which register with the openings 11 of the water receptacle and are likewise screw threaded for the reception of the pipes 12. If perchance it should be desired to use less than the entire number of tubes provided the latter may be removed together with the pipes upon which they are mounted and screw threaded stoppers 19 inserted in the openings 11 and 18.

A closure 20 is mounted upon the water receptacle 8 and is provided with a central opening in which is detachably mounted a truncated cone shaped spout 21, the lower end of which extends inwardly an appreciable distance from the inner face of said closure and is provided with a wire mesh covering 22. In this way the water receptacle may be conveniently refilled, but the entrance of flies, etc., will be prevented. The closure is equipped with a handle 23, by which it may be conveniently removed from the receptacle, the handle being of any desired ornamental configuration.

When it is desired to cut off communication through the tubes 13, a valve member generally designated 24 is mounted in the receptacle. This member comprises a head 25, the outer periphery of which is engaged by a rubber ring 26, the head having a rod 27 upstanding therefrom, by which it is manipulated. The rubber ring 26 is adapted to fit snugly against the inner periphery of the ring 17 so that the valve head may be adjusted on the ring 17 in order to diminish the volume of water passing into the tubes 13. For instance, if it should be desired to merely permit dripping of the water into the flower pots, the valve head would be so positioned that only a very small portion of each opening 18 would be uncovered.

If desired, the conical end 9 of the water receptacle may be formed to provide a seed compartment and provided with a plurality of drawers, such as that indicated at 28 in Fig. 1.

In use of this device the tubes 13 are engaged with the flower pots as shown in Fig. 1. When not in use the tubes may be either completely disengaged and the stoppers 19 used or else the tubes may be flexed upwardly and the clasps thereof engaged with the upper end of the spout 21.

Various changes may be made by me in this invention, especially in the details of construction, proportion and arrangement of parts within the scope of the appended claim.

What is claimed is:

A plant waterer including a water receptacle provided with an annular series of outlet openings adjacent the bottom of the receptacle, a single common closure for all of said openings insertible and operable from the top of the receptacle for completely or partially closing communication through the latter simultaneously, and individual closing means for each of said openings.

In testimony whereof I affix my signature in presence of two witnesses.

MARY W. MATTSON.

Witnesses:
 OSCAR HILLS,
 A. S. McLEAN.